United States Patent [19]

Hayashi et al.

[11] Patent Number: 4,776,970
[45] Date of Patent: Oct. 11, 1988

[54] LUBRICANT FOR USE IN PAPER COATING AND METHOD FOR PRODUCING THE SAME

[75] Inventors: Yoshihiro Hayashi, Chita; Takeshi Okubo, Kyoto; Kazuhiro Takeshita, Chita; Akinori Higuchi, Tokai, all of Japan

[73] Assignee: San Nopco Limited, Kyoto, Japan

[21] Appl. No.: 932,252

[22] Filed: Nov. 19, 1986

[51] Int. Cl.$^4$ .................. C10M 129/70; C10M 173/00
[52] U.S. Cl. .................. 252/49.5; 252/49.3; 252/56 R; 428/537.5
[58] Field of Search .................. 252/49.5; 428/537.5

[56] References Cited

U.S. PATENT DOCUMENTS

| | | | |
|---|---|---|---|
| 3,252,907 | 5/1966 | Kharouf et al. | 252/49.5 |
| 3,364,143 | 1/1968 | Johnson | 252/49.5 |
| 3,505,844 | 4/1970 | McLean | 252/49.5 |
| 3,507,792 | 4/1970 | Zuraw | 252/49.5 |
| 3,657,123 | 4/1972 | Stram | 252/49.5 |
| 3,857,865 | 12/1974 | Sturwold et al. | 252/49.5 |
| 3,893,931 | 7/1975 | Sturwold et al. | 252/49.5 |
| 3,912,642 | 10/1975 | Sturwold et al. | 252/49.5 |
| 3,945,930 | 3/1976 | Sugijama et al. | 252/49.5 |
| 4,137,046 | 1/1979 | Koike et al. | 428/537.5 |
| 4,659,489 | 4/1987 | Hill et al. | 252/52 A |
| 4,676,836 | 6/1987 | Hill et al. | 428/537.5 |

Primary Examiner—William R. Dixon, Jr.
Assistant Examiner—Ellen McAvoy
Attorney, Agent, or Firm—Armstrong, Nikaido, Marmelstein & Kubovcik

[57] ABSTRACT

A lubricant for paper coating compositions. The lubricant is an aqueous dispersion of an ester compound of the formula (I):

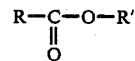

wherein R is an alkyl or alkenyl group having 3 or more carbon atoms or an alkyl or alkenyl group having a hydroxyl group, and R' is an alkyl or alkenyl group having 4 or more carbon atoms, provided that the total number of carbon atoms of R and R' is 15 or more. The lubricant is made by emulsifying or dispersing the ester compound with a high-speed agitation emulsifying device or piston-type high pressure emulsifying device in the presence of water and nonionic and anionic surfactants or the salt of a copolymer of an $\alpha,\beta$-unsaturated dibasic acid or its monoester with styrene.

6 Claims, No Drawings

LUBRICANT FOR USE IN PAPER COATING AND METHOD FOR PRODUCING THE SAME

The present invention relates to a lubricant for use in paper coating. More particularly, it relates to a lubricant for use in paper coating compositions composed mainly of pigments and binders.

Hitherto, for lubricants for use in paper coating, there have been used metal salts of higher fatty acids, higher fatty acid amides, wax emulsions, polyethylene glycol, polyethylene glycol esters, liquid hydrocarbon oil emulsions, polyethylene dispersions and aliphatic sulfated oils. These lubricants, however, have a defect that, because of their poor releasing effect and antidusting effect during calendering of offset paper, gravure paper, etc., stains are produced on the surface of calender rolls. Particularly, in producing coated paper with a low adhesive strength binder or coated paper of a low binder level, for example gravure paper, etc., these lubricants have a defect that, because of their entire shortage of the anti-dusting effect during supercalendering, marked dusting is generated on the supercalenders to often force a person to stop calendering and clean the surface of calender rolls. Increasing the amount of lubricant added can decrease the generation of dusting to some degree but it causes a reduction in the friction coefficient of coated paper to impart to the paper too much slip which hinders rewinding of the coated paper, sheet feeding to a sheet-fed press, etc. There is a limitation, therefore, to increasing the amount of lubricant. Also, these lubricants have a defect that they have little effect to improve the print gloss of coated paper.

Recently, it is reported that higher fatty acid esters such as higher fatty acid sucrose esters [Japanese patent Kokai No. 55,707/1977.] and aqueous emulsions of dimers of higher fatty acids (ibid., No. 65,074/1981) can be used as antiblocking agents or antidusting agents. All of these higher fatty acid esters, however, are insufficient in any of the releasing effect, antidusting effect and print gloss improving effect like the foregoing lubricants, it being impossible to solve the defects of the conventional lubricants. Further, these higher fatty acid esters have a defect of increasing the missing dots rate in gravure printing.

The present inventors extensively studied to develop a lubricant which is superior in the releasing effect and antidusting effect during calendering as compared with the conventional lubricants, and yet exhibits not only these effects but also the print gloss improving effect at lower dosage levels than in the conventional lubricants. As a result, the present inventors attained to the present invention.

The present invention provides a lubricant for paper coating which comprises the aqueous dispersion of an ester compound represented by the general formula (I),

wherein R represents an alkyl or alkenyl group having 3 or more carbon atoms or an alkyl or alkenyl group having a hydroxyl group, and R' represents an alkyl or alkenyl group having 4 or more carbon atoms, provided that the total number of carbon atoms of R and R' is 15 or more.

In the general formula (I), the number of carbon atoms of R representing an alkyl or alkenyl group or the same group having a hydroxyl group is generally 3 or more, preferably from 7 to 21, more preferably from 11 to 21. Similarly, the number of carbon atoms of R' representing an alkyl or alkenyl group is generally 4 or more, preferably from 8 to 22, more preferably from 12 to 22. The total number of carbon atoms of R and R' is generally 15 or more, preferably from 19 to 43, more preferably from 23 to 43. When the number of carbon atoms of R is less than 3 or that of R' is less than 4 or the total number of carbon atoms of R and R' is less than 15, the lubricating effect is so insufficient that satisfactory releasing effect and antidusting effect cannot be obtained.

Generally, R is the residue of a saturated or unsaturated carboxylic acids having 3 or more carbon atoms. For example, there may be mentioned the following carboxylic acids: saturated fatty acids such as butyric acid, valeric acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachic acid, behenic acid, lignoceric acid, cerotic acid, montanic acid, etc.; unsaturated fatty acids such as butenoic acid, pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, hexadecenoic acid, octadecenoic acid, gadoleic acid, erucic acid, linoleic acid, linolenic acid, stearolic acid, etc.; saturated or unsaturated fatty acids having a carbon ring such as α-cyclohexyldecanoic acid, hydnocarpic acid, etc., fatty acids having a hydroxyl group such as 12-hydroxystearic acid, ricinoleic acid, etc.; and structurally isomeric fatty acids of the above saturated or unsaturated fatty acids such as 2-ethylcaproic acid isostearic acid, oleic acid, elaidic acid, etc.

Among these fatty acids, preferred ones are fatty acids having from 8 to 22 carbon atoms, and more preferred ones are straight-chain saturated fatty acids having from 12 to 22 carbon atoms such as lauric acid, myristic acid, palmitic acid, stearic acid and behenic acid. Also, R may be the residue of carboxylic acid anhydrides or carboxylic acid halides, and for example there may be mentioned saturated or unsaturated fatty acid anhydrides such as caprylic acid anhydride, stearic acid anhydride, oleic acid anhydride, etc.; and saturated or unsaturated fatty acid halides such as caprylic acid chloride, palmitic acid bromide, stearic acid chloride, oleic acid chloride, etc.

These carboxylic acids, carboxylic acid anhydrides and carboxylic acid halides may be used alone or in mixture of two or more of them.

In addition to the foregoing carboxylic acids, carboxylic acids having an aromatic group such as benzoic acid, ω-phenylcapric acid, etc., or halogenated fatty acids such as chlorinated stearic acid, etc. may be used together.

Generally, R' is the residue of saturated or unsaturated alcohols having 4 or more carbon atoms. For example, there may be mentioned the following alcohols: Saturated aliphatic alcohols such as butyl alcohol, amyl alcohol, hexyl alcohol, heptyl alcohol, octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, eicosyl alcohol, behenyl alcohol, 2-undecyltetradecyl alcohol, etc.; unsaturated alcohols such as dodecenol, fiseteryl alcohol, oleyl alcohol, gadoleyl alcohol, 11-docosenol, etc.; alcohols having a carbon ring such as cyclohexanol, etc.; and structurally isomeric alcohols of the above saturated or unsaturated aliphatic alcohols such as 2-ethylhexyl alcohol, isotridecyl alcohol, sec-tridecyl alcohol, isostearyl alcohol, 2-octadecenyl alcohol, etc.

Among these aliphatic alcohols, preferred ones are aliphatic alcohols having from 8 to 22 carbon atoms, and more preferred ones are saturated aliphatic alcohols having from 12 to 22 carbon atoms such as lauryl alcohol, isotridecyl alcohol, myristyl alcohol, cetyl alcohol, stearyl alcohol, behenyl alcohol, etc.

The emulsifier or dispersant used for emulsification or dispersion of said ester compounds comprises as integral ingredients either at least one nonionic surfactant selected from the group consisting of polyoxyethylene alkylphenyl ethers, polyoxyethylene alkyl ethers and polyoxyethylene alkyl esters and at least one anionic surfactant selected from the group consisting of sulfonate-type and sulfate-type anionic surfactants, or the salt of copolymers of an $\alpha$, $\beta$-unsaturated dibasic acid or its monoester with styrene. Containing these ingredients is a requirement for obtaining stable emulsions or dispersions having a high concentration and low viscosity Polyoxyethylene alkylphenyl ether includes addition polymers of an alkyl group-substituted phenol with ethylene oxide. The number of carbon atoms of said alkyl group is generally from 6 to 12, preferably from 7 to 10, more preferably from 8 to 9, and the number of moles of ethylene oxide used in the addition polymerization is generally from 4 to 70, preferably from 4 to 50, more preferably from 5 to 25.

Polyoxyethylene alkyl ether includes addition polymers of a higher alcohol with ethylene oxide. The number of carbon atoms of said higher alcohol is generally from 8 to 20, preferably from 12 to 20, more preferably from 16 to 18, and the number of moles of ethylene oxide used in the addition polymerization is generally from 5 to 70, preferably from 13 to 50, more preferably from 22 to 45.

Polyoxyethylene alkyl ester includes mono- or diesters of a higher fatty acid with polyethylene glycol. The number of carbon atoms of said higher fatty acid is generally from 8 to 20, preferably from 12 to 20, more preferably from 16 to 18, and polyethylene glycol comprises generally from 5 to 70 moles, preferably from 13 to 50 moles, more preferably from 22 to 45 moles of ethylene oxide. A more preferred polyoxyethylene alkyl ester is the monoester which is low in thickening effect.

The sulfonate-type anionic surfactant includes for example alkylbenzene sulfonates such as tetrapropylenebenzenesulfonates, straight-chain dodecylbenzenesulfonates, eicosylbenzenesulfonates, etc.; $\alpha$-olefinsulfonates such as 1-hexadecenesulfonates, etc.; N-methyl-N-oleyltaurine; dialkyl sulfosuccinates such as di-2-ethylhexyl sulfosuccinates, etc.; alkylsulfonates such as tetradecylsulfonates, hexadecylsulfonates, petroleumsulfonates, etc.; $\alpha$-sulfofatty acid salts such as $\alpha$-sulfopalmitates, etc.; ester containing sulfonates such as ethyl $\alpha$-sulfolaurate, dioctyl sulfosuccinates, etc.; polyoxyethylene styrenated phenyl ether sulfonates; naphthalenesulfonate/formaldehyde condensates having a condensation degree of from 2 to 12; etc.

The sulfate-type anionic surfactant includes for example alkyl sulfates such as stearyl sulfates, etc.; sulfated oils
such as sulfated castor oil, etc.; polyoxyethylene alkyl ether sulfates, polyoxyethylene styrenated phenyl ether sulfates.

The sulfonates and sulfates as used herein refer to the ammonium, sodium, potassium, calcium, magnesium and amines (e.g. diethanolamine) salts of a sulfonic acid group or sulfuric acid group. Among these anionic surfactants, preferred ones are alkylbenzenesulfonates such as straight-chain dodecylbenzenesulfonates, etc.; alkylsulfonates such as tetradecylsulfonates, hexadecylsulfonates, petroleumsulfonates, etc.; naphthalenesulfonate/formaldehyde condensates having a condensation degree of from 2 to 10; and stearylsulfates. Preferred salts are the ammonium salt, sodium salt and potassium salt.

The salts of the copolymers of an $\alpha$, $\beta$-unsaturated dibasic acid or its monoester with styrene include for example the salts of copolymers of styrene with the following acids or their monoesters: maleic acid, fumaric acid, monomethyl maleate, monoisopropyl maleate, monobutyl maleate, monoester of maleic acid with ethylene glycol monobutyl ether, etc. Preferred salts include generally alkali metal salts and ammonium salts.

When the emulsifier or dispersant is said nonionic surfactant, its amount used is generally from 3 to 40 parts by weight, preferably from 5 to 20 parts by weight, based on 100 parts by weight of said ester compound (I). When the emulsifier or dispersant is said anionic surfactant, its amount used is generally from 0.1 to 10 parts by weight, preferably from 0.2 to 5 parts by weight, more preferably from 0.3 to 2 parts by weight based on 100 parts by weight of said ester compound (I). Further, when the emulsifier or dispersant is the salts of copolymers of an $\alpha$, $\beta$-unsaturated dibasic acid or its monoester with styrene, its amount used is generally from 2 to 30 parts by weight, preferably from 3 to 20 parts by weight based on 100 parts by weight of said ester compound (I).

The aqueous dispersion of the ester compound (I) can be obtained as follows: The compound (I) is melted at a temperature of from 60° to 150° C. and poured into water of from 60° to 100° C. containing a required amount of dissolved emulsifier or dispersant, or a required amount of the emulsifier or dispersant is previously dissolved in the melted ester compound (I) of from 60° to 150° C. and poured into water of from 60° to 100° C.; and the resulting mixture is emulsified or dispersed at a temperature of from 60° to 100° C. by means of a high-speed agitation emulsifying device at a rate of from 500 to 10000 rpm or a piston-type high-pressure emulsifying device at a pressure of from 50 to 500 kg/cm$^2$ and then cooled. The ester compound (I) can be synthesized by the conventional methods. For example, a fatty acid or its acid halide and a monohydric aliphatic alcohol in a former to latter molar ratio of, generally, 1 to 1, or a fatty acid anhydride and a monohydric aliphatic alcohol in a former to latter molar ratio of, generally, 1 to 2 are subjected to dehydration or dehydrohalogenation at a temperature of from 70° to 200° C. in a nitrogen atmosphere until a required percent esterification is reached. For promoting esterification, catalysts such as hydrogen chloride, sulfuric acid, p-toluenesulfonic acid, boron trifluoride etherate, etc.

may be used together. Dehydration or dehydrohalogenation may be carried out under reduced pressure, or dehydration may be carried out azeotropically using a solvent such as toluene, xylene, etc.

In using the lubricants for paper coating of the present invention, they may be mixed, in advance or in situ, with antioxidants, ultraviolet absorbers, water insolubilizers, antiseptic/anti-mould agents, insecticidal/fungicidal agents, dispersing agents, defoaming agents, deodorizing agents, perfumes, extenders, dyes, pigments, or other lubricants (e.g. calcium stearate, zinc stearate, potassium oleate, paraffin wax, polyethylene wax).

In using the lubricants for paper coating of the present invention, they are added to paper coating colors composed mainly of pigments and binders. The pigments include inorganic pigments such as clay, calcium carbonate, titanium dioxide, satin white, barium sulfate, talc, zinc oxide, etc., organic pigments such as plastic pigments (polystyrene described in Japanese patent Publication No. 6524/1971) and combinations thereof. The binders include natural binders, synthetic binders and mixtures thereof. The natural binders include starch, modified starch, soybean protein, casein, etc. The synthetic binders include styrene/butadiene latices; acrylic resin emulsions, particularly aqueous suspensions of polymers containing a small amount of a copolymerized ethylenically unsaturated carboxylic acid; butadiene/acrylonitrile copolymers, vinyl acetate/acrylate copolymers, butadiene/methyl methacrylate copolymers, vinyl chloride/vinylidene chloride copolymers, homopolymers comprising butadiene, methyl methacrylate, vinyl acetate, chloroprene, vinyl chloride and butyl methacrylate; and latices of polymeric materials which are at least partially soluble in aqueous media such as polyvinyl alcohol.

The amount calculated as solid of the lubricants for paper coating of the present invention is generally from 0.1 to 20 parts by weight, preferably from 0.2 to 10 parts by weight, more preferably from 0.3 to 5 parts by weight based on 100 parts by weight of the pigments. When the amount is less than 0.1 part by weight, any of the releasing effect, antidusting effect and print gloss improving effect is insufficient, and when it is larger than 20 parts by weight, the coated paper becomes too slippery, either of the both cases being not preferred.

The paper coating colors obtained with the lubricants for paper coating of the present invention are generally used in the form of aqueous dispersions. To the colors are added, as need arises, other additives such as dispersing agents (e.g. sodium pyrophosphate, sodium hexametaphosphate, sodium polyacrylate), defoaming agents (e.g. paraffin, phosphoric acid esters, polyglycol, silicone compounds), leveling agents (e.g. urea, dicyandiamide), water retention agents, flow modifiers (e.g. carboxymethyl cellulose, sodium alginate, hydroxyethyl cellulose), water insolubilizers (e.g. urea resins, melamine resins, glyoxal), antiseptic agents (e.g. formalin, fluorescent dyes, etc.

The paper coating colors of the present invention can be applied to base papers, for example, by means of air knife coaters, trailing blade coaters, inverted coaters, roll coaters, applicators, etc. After coating, the coated paper is dried and if necessary, finished by calendering or supercalendering. The coating temperature is generally from 10° to 60° C., the drying temperature is generally from 90° to 130° C., and the calendering temperature and supercalendering temperature are from 40° to 100° C.

The lubricants for paper coating of the present invention are very superior in the releasing effect and antidusting effect during calendering, and yet these effects are far superior to those of the conventional lubricants such as calcium stearate, etc. even at as low a dosage as from half to one-third of that of the conventional lubricants. Further, such a great reduction in the dosage made it possible to eliminate various adverse effects which cannot be avoided when the conventional lubricants are used at high dosage levels for the purpose of antidusting. Such adverse effects include efficiency reduction of paper rewinding and sheet feeding to a sheet-fed press owing to too much slip of paper, reduction in printability such as ink receptivity and wet strength of coated paper, reduction in glueability and blister pack property of coated white board, etc.

Also, the lubricants of the present invention have an effect to improve the print gloss of coated paper which has never been obtained with the conventional lubricants. Further, the lubricants, because of their antidusting effect, have also effects of improving the smoothness of coated paper, reducing missing dots in gravure printing and improving sheet gloss.

The lubricants for paper coating of the present invention can also be used as a sizing agent. The dosage can be varied, but it is generally from 0.01 to 5 wt. %, preferably from 0.05 to 2 wt. %, more preferably from 0.1 to 1 wt. %, as converted to solid basis, based on pulp. Paper which is sizable with the present lubricants is not particularly limited, but covers a wide range of base papers as well as papers made in a wide pH range independently of treatment with paper strength resins. When the lubricants of the present invention are used as a sizing agent, it suffices to add the present sizing agent and a fixing agent to an aqueous dispersion containing beaten pulp and a filler such as clay, calcium carbonate, etc. and after mixing, to make paper from the dispersion.

The lubricants of the present invention can also be used as a water insolubilizer for cement, gypsum board, etc.

The present invention will be illustrated with reference to the following examples, but it is not limited to these examples.

EXAMPLES 1 to 11

Preparation of Lubricant A

To an emulsifying machine or disperser equipped with a piston-type high-pressure emulsifying device were added 1230 g of water, 45 g of an addition polymer of octylphenol with 13 moles of ethylene oxide, 140 g of an addition polymer of lauryl alcohol with 14 moles of ethylene oxide, 45 g of a monoester of myristic acid with polyethylene glycol comprising 70 moles of ethylene oxide, 8 g of sodium dodecylbenzenesulfonate and 12 g of a sodium naphthalenesulfonate/formaldehyde condensate of a condensation degree of 5, and the mixture was heated to 80° C. to turn it into uniform solution. To the solution was added with stirring 1000 g of an ester of 2-undecyltetradecyl alcohol with montanic acid previously heated to 120° C., and the mixed solution was emulsified on the piston-type high-pressure emulsifying device at a pressure of 300 kg/cm$^2$ and then immediately cooled to 28° C. Thus, a white emulsion or dispersion having a concentration of 50% and a viscosity of 300 cps (measured at 25° C.; same applies in the examples which follow) was obtained and designated as "lubricant A".

Preparation of Lubricant B

To the same emulsifying machine or disperser as used in the preparation of the lubricant A were added 1190 g of water, 90 g of an addition polymer of stearyl alcohol with 7 moles of ethylene oxide, 80 g of an addition polymer of lauryl alcohol with 14 moles of ethylene oxide and 15 g of a sodium salt of dihexyl sulfosuccinate and 5 g of sodium laurylsulfonate, and the mixture was heated to 70° C. to turn it into uniform solution. To the solution was added with stirring 1000 g of behenyl behenate previously heated to 120° C., and the mixed solution was emulsified on the piston-type high-pressure emulsifying device at a pressure of 300 kg/cm$^2$ and then immediately cooled to 28° C. Thus, an emulsion or dispersion having a concentration of 50% and a viscosity of 150 cps was obtained and designated as "lubricant B".

Preparation of Lubricant C

To the same emulsifying machine or disperser as used in the preparation of the lubricant A were added 1138 g of water, 85 g of an addition polymer of stearyl alcohol with 14 moles of ethylene oxide, 25 g of a monoester of lauric acid with polyethylene glycol comprising 18 moles of ethylene oxide, 20 g of an addition polymer of nonylphenol with 20 moles of ethylene oxide, 4 g of a sodium naphthalenesulfonate/formaldehyde condensate of an average condensation degree of 3 and 4 g of sodium dodecylbenzenesulfonate, and the mixture was heated to 80° C. to turn it into uniform solution. To the solution was added with stirring 1000 g of stearyl stearate previously heated to 120° C., and the mixed solution was emulsified on a piston-type high-pressure emulsifying device at a pressure of 250 kg/cm$^2$ and then immediately cooled to 25° C. Thus, a white emulsion or dispersion having a concentration of 50% and a viscosity of 120 cps was obtained and designated as "lubricant C".

Preparation of Lubricant D

To a high-speed agitation apparatus were added 1000 g of oleyl oleate, 60 g of an addition polymer of lauryl alcohol with 14 moles of ethylene oxide, 25 g of an addition polymer of stearyl alcohol with 23 moles of ethylene oxide, 40 g of a monoester of stearic acid with polyethylene glycol comprising 45 moles of ethylene oxide, 25 g of a monoester of myristic acid with polyethylene glycol comprising 23 moles of ethylene oxide, 10 g of sodium petroleumsulfonate and 0.15 g of potassium hydroxide. The resulting mixture was uniformly mixed at a temperature of 80° C., stirred at a high speed of 3000 rpm while adding 1160 g of 80° C. water in portions and then cooled to 27° C. Thus, a pale yellowish white emulsion or dispersion having a concentration of 50% and a viscosity of 60 cps (at 25° C.) was obtained and designated as "lubricant D".

Preparation of Lubricants E to J

Lubricants E to J were obtained in the same condition as in the preparation of the lubricant C. Every lubricant has a concentration of 50%. A white emulsion or dispersion of lauryl stearate having a viscosity of 105 cps is lubricant E. A white emulsion or dispersion of lauryl 12-hydroxystearate having a viscosity of 230 cps is lubricant F. A white emulsion or dispersion of 2-ethylhexyl stearate having a viscosity of 90 cps is lubricant G. A white emulsion or dispersion of butyl stearate having a viscosity of 80 cps is lubricant H. A white emulsion or dispersion of 2-ethylhexyl laurate having a viscosity of 85 cps is lubricant 1. A white emulsion or dispersion of palmityl butyrate having a viscosity of 80 cps is lubricant J.

Preparation of Lubricant P

To an emulsifying machine or disperser equipped with a piston-type high-pressure emulsifying device were added 1500 g of water and 75 g of the ammonium salt of a copolymer of monobutyl maleate with styrene, and the resulting mixture was heated to 80° C. to turn it into uniform solution. After adding 1425 g of lauryl stearate previously heated to 90° C. to the solution with stirring, the mixed solution was emulsified on the piston-type high-pressure emulsifying device at a pressure of 300 kg/cm$^2$ and then cooled to 30° C. Thus, a white emulsion or dispersion having a concentration of 50% and a viscosity of 60 cps was obtained and designated as "lubricant P".

COMPARATIVE EXAMPLES 12 to 17

Preparation of Lubricants K to M

Lubricants K to M were obtained in the same condition as in the preparation of the lubricant C. Every lubricant has a concentration of 50%. An emulsion or dispersion of methyl stearate having a viscosity of 210 cps is lubricant K. An emulsion or dispersion of lauryl acetate having a viscosity of 130 cps is lubricant L. An emulsion or dispersion of butyl caprylate having a viscosity of 75 cps is lubricant M.

Preparation of Lubricant N

To the same emulsifying machine or disperser as used in the preparation of the lubricant A were added 1130 g of water, 120 g of a addition polymer of nonylphenol with 9.5 moles of ethylene oxide and 10 g of a sodium naphthalenesulfonate/formaldehyde fondensate of an average condensation degree of 3, and the resulting mixture was heated to 70° C. to turn it into uniform solution. After adding 1000 g of ethylene glycol distearate previously heated to 120° C. to the solution with stirring, the mixed solution was emulsified at a high pressure of 300 kg/cm$^2$ and then immediately cooled to 25° C. Thus, a pale yellowish white emulsion or dispersion having a concentration of 50% and a viscosity of 200 cps was obtained and designated as "lubricant N".

Preparation of Lubricant O

A commercially available 50% calcium stearate dispersion was designated as "lubricant O".

Preparation of Lubricant Q

An emulsion or dispersion of lauryl stearate was prepared in the same manner as in the preparation of the lubricant E except that anionic surfactants, i.e. a sodium napthalenesulfonate/formaldehyde condensate of a condensation degree of 3 and sodium dodecylbenzenesulfonate were not added. The emulsion obtained had an abnormally high viscosity of 15000 cps at a concentration of 50%, and solidified in only one day, so that it could not be put to practical use.

Coating colors were prepared using the lubricants A to J and P of the present invention and for comparison, coating colors containing the lubricants K to 0 and no lubricant (blank) were prepared. Coated papers for test were prepared by applying these coating colors and evaluated for the antidusting property during supercalendering and physical properties as coated paper. The results are shown in Tables 1 and 2. The antidusting property was evaluated on both gravure paper prepared with a coating color for gravure printing and offset paper prepared with a coating color for offset printing. The physical properties as coated paper were evaluated on the offset paper. The coating color for gravure printing is a dispersion for paper coating having a solid content of 62% and a pH of 9.0 and comprising 45 parts of No. 1 pre-dispersed clay (Ultra White 90; a product of EMC Co.), 55 parts of No. 2 pre-dispersed clay (HT clay; a product of EMC Co.), 0.2 part of sodium polyacrylate type dispersing agent (SN-Dispersant 5040; a product of San Nopco Ltd.), 0.3 part of sodium hydroxide, 0.3 part of carboxymethyl cellulose (Cellogen PR; a product of Daiichi Kogyo Seiyaku Co.), 8 parts of carboxyl-modified styrene/butadiene copolymeric latex (JSR 0628; a product of Nippon Synthetic Rubber Co.) and 0 to 1 part of the lubricant.

The coating color for offset printing is a dispersion for paper coating having a solid content of 62% and a pH of 9.0 and comprising 70 parts of No. 1 pre-dispersed clay (the same as above), 15 parts of precipitated calcium carbonate (Tamapal TP-222H; a product of Okutama Kogyo Co.), 15 parts of ground calcium carbonate (Escaron #1500; a product of Sankyo Seifun Kako Co.), 0.2 part of sodium polyacrylate type dispersing agent (the same as above), 5 parts of oxidized starch (MS-3800; a product of Nippon Shokuhin Kako Co.), 12 parts of carboxyl-modified styrene/butadiene copolymeric latex (JSR 0692; a product of Nippon Synthetic Rubber Co.) and 0 to 1 part of the lubricant.

All the amounts of the ingredients of the above coating colors are part by weight converted to solid basis.

These coating colors were coated by means of a helicoater onto wood containing paper of a basis weight of 65 g/m² for gravure paper and onto wood free paper of the same basis weight for offset paper. The amount of the coating color applied was 12 g/m² for gravure paper and 16 g/m² for offset paper.

The antidusting property was evaluated as follows: The coated paper obtained was passed through a supercalender at a temperature of 70° C. and at a nip pressure of 150 kg/cm, and the state of generation of dusting on the surface of the chilled roll was evaluated with naked eyes and expressed by the 10-point evaluation method. In this evaluation method, 10 is the best and 1 is the poorest.

The coated paper for measuring the physical properties as coated paper was tested after supercalendering at a temperature of 50° C. and at a nip pressure of 80 kg/cm.

As is apparent from the results of Table 1 and Table 2, the lubricants for paper coating of the present invention exhibit at a low dosage level excellent antidusting effect as well as excellent effect to improve sheet gloss, particularly print gloss.

TABLE 1

| | | Antidusting property | | | | | | | |
|---|---|---|---|---|---|---|---|---|---|
| | | Item Antidusting property **(10-point evaluation method) | | | | | | | |
| | | Paper | | | | | | | |
| | | Gravure paper | | | | Offset paper | | | |
| | | *Dosage of lubricant (%) | | | | | | | |
| | Lubricant | 1.5 | 1.0 | 0.5 | 0 | 1.0 | 0.6 | 0.3 | 0 |
| Example | A | 9.5 | 9.0 | 8.5 | — | 9.8 | 9.5 | 9.0 | — |
| | B | 9.5 | 9.0 | 8.5 | — | 9.8 | 9.5 | 9.0 | — |
| | C | 9.5 | 9.0 | 8.5 | — | 9.8 | 9.5 | 9.0 | — |
| | D | 9.5 | 9.0 | 8.5 | — | 9.8 | 9.5 | 9.0 | — |
| | E | 9.5 | 9.0 | 8.5 | — | 9.5 | 9.3 | 8.8 | — |
| | F | 9.5 | 9.0 | 8.5 | — | 9.5 | 9.3 | 8.8 | — |
| | G | 9.0 | 8.5 | 7.5 | — | 9.5 | 9.2 | 8.5 | — |
| | H | 8.5 | 8.0 | 7.0 | — | 9.3 | 9.0 | 8.3 | — |
| | I | 8.5 | 7.5 | 6.5 | — | 9.0 | 8.5 | 8.0 | — |
| | J | 8.5 | 7.5 | 6.5 | — | 9.0 | 8.5 | 8.0 | — |
| | P | 9.5 | 9.0 | 8.5 | — | 9.5 | 9.3 | 8.8 | — |
| Comparative example | K | 6 | 5.5 | 4.5 | — | 7.5 | 6.5 | 6.0 | — |
| | L | 5.5 | 5 | 4.0 | — | 6.5 | 6.0 | 5.0 | — |
| | M | 4.5 | 4.0 | 4.0 | — | 5.5 | 5.5 | 5.0 | — |
| | N | 6.5 | 5.5 | 4.5 | — | 7.0 | 6.5 | 6.0 | — |
| | O | 6 | 5.5 | 4.5 | — | 7.0 | 6.5 | 6.0 | — |
| | Blank | — | — | — | 3.5 | — | — | — | 5.0 |

*Expressed by wt. % based on the pigment in the coating color.
**10-Point evaluation method: (best) 10–1 (Poorest)

TABLE 2

| | | | Physical properties as coated paper | | | | | |
|---|---|---|---|---|---|---|---|---|
| | Lubricant | | | Sheet | Print | | | Wet ink |
| | Name | Dosage (%) | Whiteness (%) | gloss (%) | gloss (%) | Dry pick | Wet pick | receptivity |
| | | | | | | 10-Point evaluation method | | |
| Example | A | 1 | 80.6 | 77.4 | 86.1 | 9 | 8.5 | 7 |
| | B | 1 | 80.5 | 77.3 | 86.1 | 9 | 8.5 | 7 |
| | C | 1 | 80.5 | 77.4 | 86.0 | 9 | 8 | 7 |
| | D | 1 | 80.5 | 77.3 | 85.9 | 9 | 8 | 7 |
| | E | 1 | 80.6 | 77.0 | 85.7 | 9 | 8 | 7 |
| | F | 1 | 80.5 | 77.2 | 86.5 | 9 | 8 | 7.5 |
| | G | 1 | 80.5 | 76.9 | 85.5 | 9 | 8 | 7 |
| | H | 1 | 80.5 | 76.3 | 84.8 | 9 | 8 | 7 |
| | I | 1 | 80.5 | 76.2 | 84.2 | 9 | 8 | 7 |
| | J | 1 | 80.5 | 76.0 | 83.9 | 9 | 8 | 7 |
| | P | 1 | 80.5 | 77.1 | 85.6 | 9 | 8 | 7 |
| Comparative example | K | 1 | 80.5 | 75.6 | 82.6 | 9 | 8 | 7 |
| | L | 1 | 80.5 | 75.4 | 82.4 | 9 | 8 | 7 |
| | M | 1 | 80.5 | 75.1 | 82.3 | 9 | 8 | 7 |
| | N | 1 | 80.4 | 75.0 | 82.3 | 9 | 8 | 7 |
| | O | 1 | 80.5 | 75.2 | 82.4 | 9 | 8 | 7 |
| | Blank | — | 80.5 | 75.0 | 82.2 | 9 | 8 | 7 |

What is claimed is:
1. A lubricant for paper coating which comprises, an aqueous dispersion of an ester compound represented by the formula (I),

$$R-\underset{\underset{O}{\|}}{C}-O-R' \qquad (I)$$

wherein R represents an alkyl group having 11 to 21 carbon atoms or an alkyl group having a hydroxyl group and having 11 to 21 carbon atoms, and R' represents an alkyl group having 12 to 22 carbon atoms, and an emulsifier or a dispersant is wherein the emulsifier or the dispersant is 0.1 to 40 parts by weight based on 100 parts by weight of the ester of compound of formula (I).

2. A lubricant as claimed in claim 1 wherein said ester compound has been emulsified or dispersed with at least one nonionic surfactant selected from the group consisting of polyoxyethylene alkyl ether, polyoxyethylene alkyl ester and polyoxyethylene alkylphenyl ether and at least one anoinic surfactant selected from the group consisting of sulfonate-type anionic surfactants and sulfate-type anionic surfactants.

3. A lubricant as claimed in claim 1 wherein said ester compound has been emulsified or dispersed with the salt of a copolymer of an $\alpha, \beta$-unsaturated dibasic acid or its monoester with styrene.

4. A method for producing a lubricant for paper coating comprising an aqueous dispersion characterized by dispersing an ester compound represented by the general formula, $$R-\underset{\underset{O}{\|}}{C}-O-R' \qquad (I)$$

wherein R represents an alkyl group having 11 to 21 carbon atoms or an alkyl group having a hydroxyl group and having 11 to 21 carbon atoms, and R' represents an alkyl group having 12 to 22 carbon atoms, by means of a high-speed agitation emulsifying device or piston-type high-pressure emulsifying device in the presence of water and a nonionic and aionic surfactants or the salt of a copolymer of an $\alpha, \beta$-unsaturated dibasic acid or its monoester with styrene.

5. A coated paper comprising a paper substrate and coated thereon a coating composition comprising the lubricant of claim 1 and a pigment wherein the amount of lubricant in the coating composition is 0.1 to 20 parts by weight calculated as solids, based on 100 parts by weight of the pigment.

6. A coated paper comprising a paper substrate and coated thereon a coating composition comprising the lubricant of claim 2 and a pigment, wherein the amount, calculated as solids, of the lubricant in the coating composition is 0.1 to 20 parts by weight based on 100 parts by weight of the pigment.

* * * * *

UNITED STATES PATENT AND TRADEMARK OFFICE
CERTIFICATE OF CORRECTION

PATENT NO. : 4,776,970
DATED : October 11, 1988
INVENTOR(S) : Yoshihiro HAYASHI et al It is certified that error appears in the above-identified patent and that said Letters Patent is hereby corrected as shown below:

On the cover page, please add the following:

-- [30]     Foreign Application Priority Data

Nov. 20, 1985 [JP] ...................... 60-262131 --.

Signed and Sealed this

Fourteenth Day of March, 1989

*Attest:*

DONALD J. QUIGG

*Attesting Officer*        *Commissioner of Patents and Trademarks*